United States Patent [19]
Allen

[11] Patent Number: 5,992,080
[45] Date of Patent: Nov. 30, 1999

[54] FISHING TRAP

[76] Inventor: Garth M. Allen, 58312 Nelson, Washington, Mich. 48094

[21] Appl. No.: 09/277,545

[22] Filed: Mar. 29, 1999

[51] Int. Cl.[6] .............................. A01K 87/00; A01K 97/11
[52] U.S. Cl. .................................. 43/19.2; 43/15; 43/18.1
[58] Field of Search ................................ 43/15, 16, 19.2, 43/21.2, 18.1

[56] References Cited

U.S. PATENT DOCUMENTS

| | | |
|---|---|---|
| 1,549,405 | 8/1925 | Bjurstrom . |
| 2,008,482 | 7/1935 | Wolf . |
| 2,628,443 | 2/1953 | Weckerling . |
| 2,638,696 | 5/1953 | Derkovitz . |
| 3,798,821 | 3/1974 | Bybee ......................................... 43/15 |
| 3,897,646 | 8/1975 | Sheets ......................................... 43/15 |
| 4,043,070 | 8/1977 | Lamothe .................................. 43/21.2 |
| 4,077,148 | 3/1978 | Carey ......................................... 43/16 |
| 4,492,053 | 1/1985 | Poulin ......................................... 43/15 |
| 4,730,408 | 3/1988 | Miller ......................................... 43/15 |
| 4,912,870 | 4/1990 | Smoluk ....................................... 43/15 |

Primary Examiner—Jack W. Lavinder

[57] ABSTRACT

A fish trap system comprising a support having a lower end and an upper end with a pivot pin therethrough. A fishing rod has a reel end with a reel couplable thereto and an eye end with a first eye coupled thereon with line extendable from the reel through the fist eye to a hook with bait. The fishing rod further having an aperture at its central extent for pivotally coupling to the pivot pin with an end aperture facing downwardly adjacent to the first edge. Also included is a trip rod having an interior end pivotally coupled to the lower end of the support and having an exterior end with a second eye in proximity to the first eye on the side thereof remote from the reel. The trip rod has a supplemental pin adjacent to the exterior end extending upwardly received in the end aperture of the fishing rod. A resilient member is provided in tension coupling the first end of the reel rod and the lower end of the support tending to urge the reel end of the rod downwardly.

5 Claims, 3 Drawing Sheets

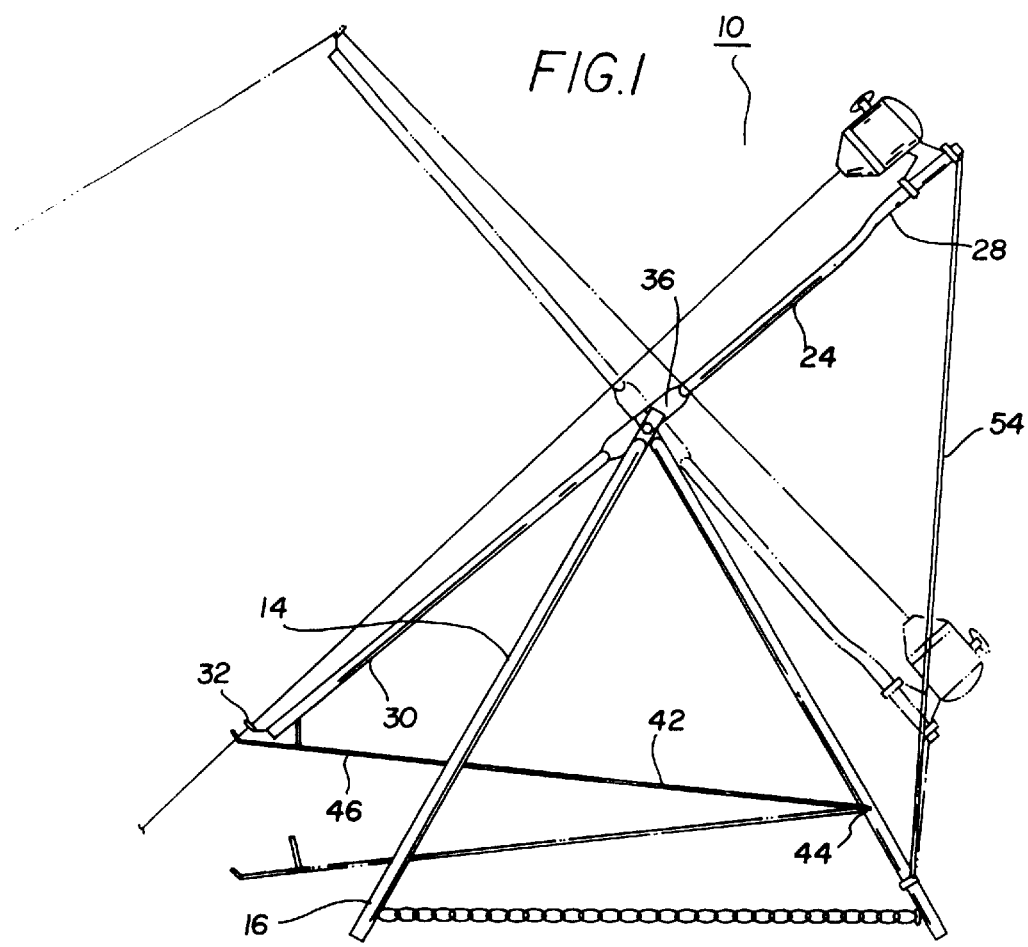
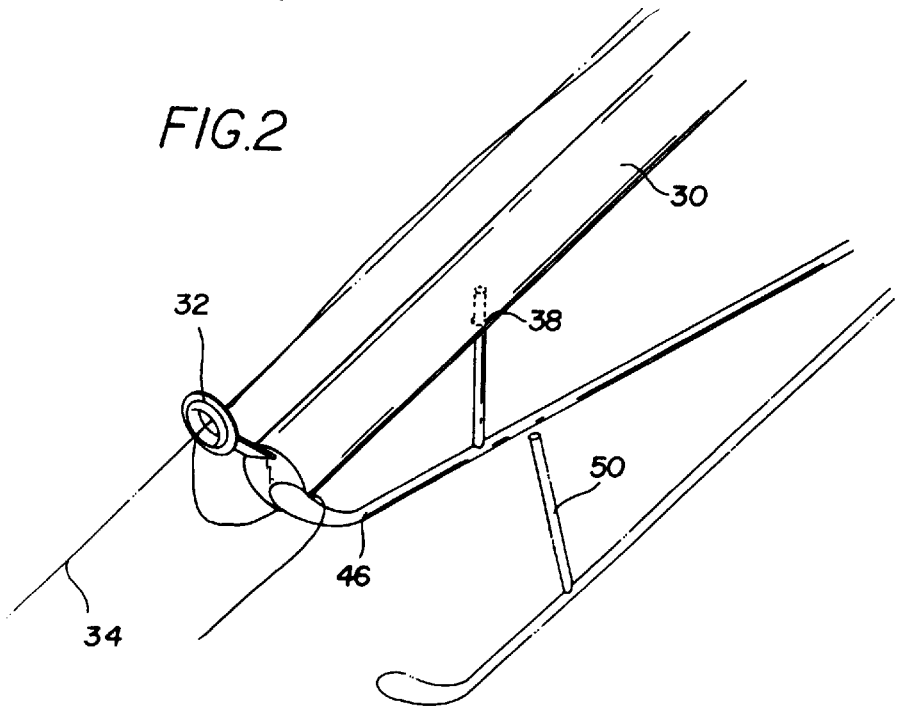

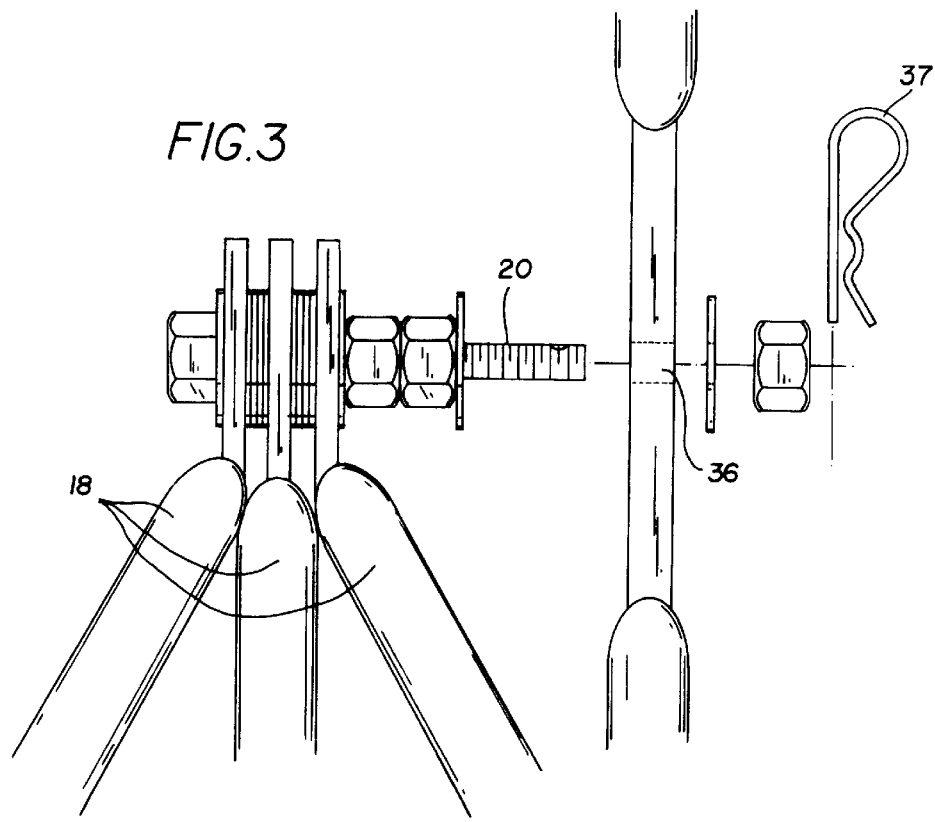
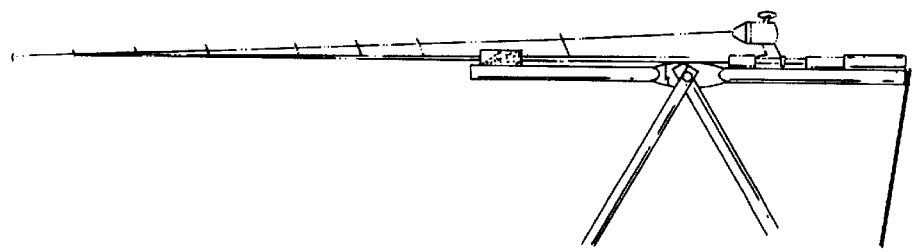

FISHING TRAP

BACKGROUND OF THE INVENTION

1. Field of the Invention

The present invention relates to a fishing trap and more particularly pertains to supporting a fishing pole to automatically set the hook in the mouth of a fish after a strike.

2. Description of the Prior Art

The use of fishing accessories of known designs and configurations is known in the prior art. More specifically, fishing accessories of known designs and configurations heretofore devised and utilized for the purpose of simplifying the fishing process through known methods and apparatuses are known to consist basically of familiar, expected, and obvious structural configurations, notwithstanding the myriad of designs encompassed by the crowded prior art which has been developed for the fulfillment of countless objectives and requirements.

By way of example, International Application Number PCT/YU97/00003 to Kobilarov discloses a Three-Armed Fishing Rod Holder With Cartridge, U.S. Pat. No. 3,431,670 to Harpham discloses a Combination Fishing Pole and Reel Holder. U.S. Pat. No. 3,354,573 to Johansson discloses Ice Fishing Tackle For Shelter Use. U.S. Des. Pat. No. Des. 330,753 to Gutirrez discloses a Combined Fishing Rod Holder and Stand. U.S. Pat. No. 4,177,595 to Chon discloses a Portable Fishing Rod Holder and Stand. Lastly, U.S. Pat. No. 4,043,070 to Lamothe discloses an Ice Fishing Rod.

While these devices fulfill their respective, particular objectives and requirements, the aforementioned patents do not describe fishing trap as disclosed herein. In this respect, the fishing trap according to the present invention substantially departs from the conventional concepts and designs of the prior art, and in doing so provides an apparatus primarily developed for the purpose of supporting a fishing pole to automatically set the hook in the mouth of a fish after a strike.

Therefore, it can be appreciated that there exists a continuing need for a new and improved fishing trap which can be used for supporting a fishing pole to automatically set the hook in the mouth of a fish after a strike. In this regard, the present invention substantially fulfills this need.

SUMMARY OF THE INVENTION

In view of the foregoing disadvantages inherent in the known types of fishing accessories of known designs and configurations now present in the prior art, the present invention provides an improved fishing trap. As such, the general purpose of the present invention, which will be described subsequently in greater detail, is to provide a new and improved fishing trap and method which has all the advantages of the prior art and none of the disadvantages.

To attain this, the present invention essentially comprises a new and improved fish trap system for supporting a fishing pole to automatically set the hook in the mouth of a fish after a strike comprises, in combination a tripod formed of three legs, each leg having a lower end positionable in a triangular orientation and an upper end coupled together with a common cylindrical pivot pin therethrough. A fishing rod is provided with a reel end with a reel coupled thereto and having an eye end with a first eye coupled thereon with line extending from the reel through the fist eye to a hook with bait. The fishing rod has an aperture at its central extent and is pivotally coupled to the pivot pin with an end aperture facing downwardly adjacent to the eye end. A trip rod is provided with an interior end which is pivotally coupled to one leg beneath the reel and with an exterior end with a second eye in proximity to the first eye on the side thereof remote from the reel. The trip rod has a supplemental pin adjacent to the exterior end extending upwardly and receivable in the end aperture of the fishing rod. Also provided is a rubber band in tension coupling the first end of the rod and the bottom of the one leg beneath the reel tending to urge the reel end of the rod downwardly under the urging of the line whereby when a fish strikes the bait, the second eye of the trip rod will move downwardly to move the supplemental pin out of the end aperture and allow the rubber band to pull the reel end of the rod downwardly to thereby jerk the line upwardly to set the hook in the mouth of a fish.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fishing trap which has all of the advantages of the prior art fishing accessories of known designs and configurations and none of the disadvantages.

It is another object of the present invention to provide a new and improved fishing trap which may be easily and efficiently manufactured and marketed.

It is further object of the present invention to provide a new and improved fishing trap which is of durable and reliable constructions.

An even further object of the present invention is to provide a new and improved fishing trap which is susceptible of a low cost of manufacture with regard to both materials and labor, and which accordingly is then susceptible of low prices of sale to the consuming public, thereby making such fishing trap economically available to the buying public.

Even still another object of the present invention is to provide a fishing trap for supporting a fishing pole to automatically set the hook in the mouth of a fish after a strike.

Lastly, it is an object of the present invention to provide a new and improved fishing trap system comprising a support having a lower end and an upper end with a pivot pin therethrough. A fishing rod having a reel end with a reel couplable thereto and having an eye end with a first eye coupled thereon with line extendable from the reel through the first eye to a hook with bait, the fishing rod having an aperture at its central extent for pivotally coupling to the pivot pin with an end aperture facing downwardly adjacent to the first edge. Also included is a trip rod having an interior end pivotally coupled to the lower end of the support and having an exterior end with a second eye in proximity to the first eye on the side thereof remote from the reel. The trip rod has a supplemental pin adjacent to the exterior end extending upwardly received in the end aperture of the fishing rod. A resilient member is provided in tension coupling the first end of the reel rod and the lower end of the support tending to urge the reel end of the rod downwardly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the fishing trap constructed in accordance with the principles of the present invention.

FIG. 2 is an enlarged perspective view of the lower portion of the fishing pole and associated components.

FIG. 3 is a side elevational view of the coupling between the tripod and the fishing pole.

FIG. 4 is a side elevational view showing the upper component of FIG. 1 but with the fishing pole in a partially deployed orientation.

The same reference numerals refer to the same parts through the various Figures.

DESCRIPTION OF THE PREFERRED EMBODIMENT

Figure 5:
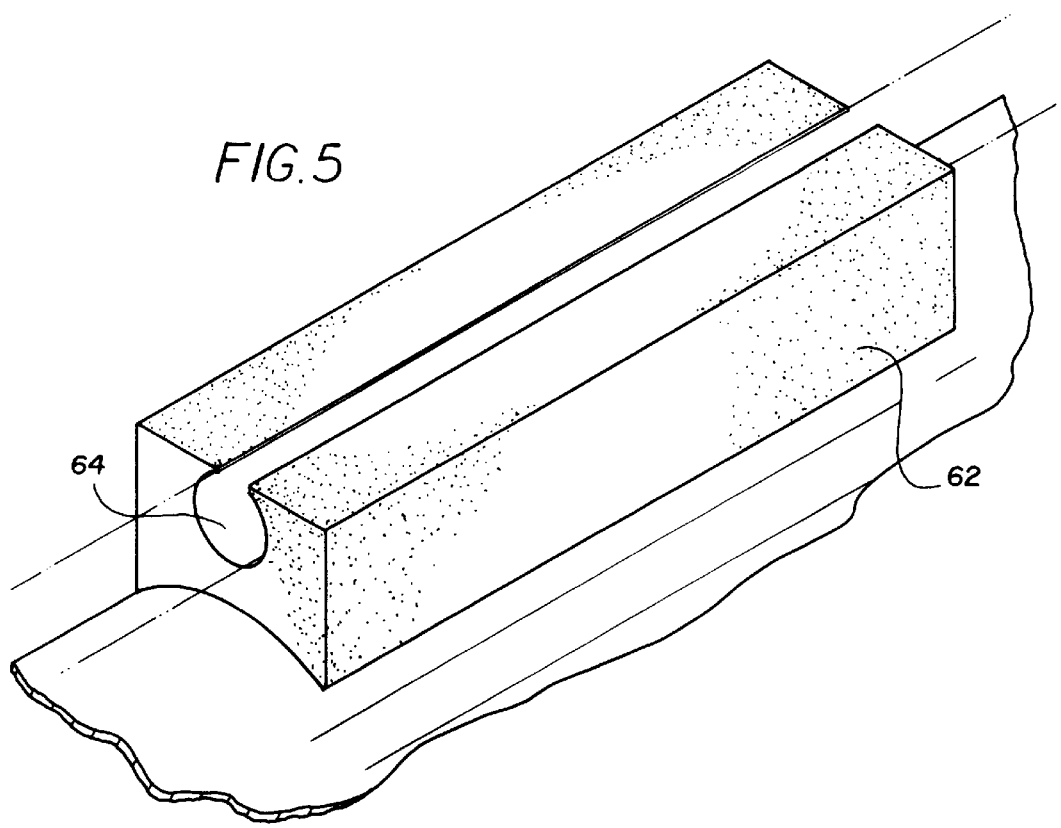
FIG. 5 shows an alternate embodiment for a fishing pole holder.

With reference now to the drawings, and in particular to FIG. 1 thereof, the preferred embodiment of the new and improved fishing trap embodying the principles and concepts of the present invention and generally designated by the reference numeral 10 will be described.

The present invention, the fishing trap 10 is comprised of a plurality of components. Such components in their broadest context include a tripod, a fishing rod, a trip rod and a rubber band. Such components are individually configured and correlated with respect to each other so as to attain the desired objective.

As described hereinabove, the present invention comprises a new and improved fish trap system 10. Such system functions for supporting a fishing pole to automatically set the hook in the mouth of a fish after a strike. The components comprise, in combination, a tripod 14 formed of three legs. Each leg has a lower end 16 positionable in a triangular orientation and an upper end 18 coupled together with a common cylindrical pivot pin 20 therethrough.

Also provided is a fishing rod 24. Such rod has a reel end 26 with a reel 28 coupled thereto. Such rod also has an eye end 30 with a first eye 32 coupled thereon with line 34 extending from the reel through the first eye to a hook with bait. The fishing rod has an aperture 36 at its central extent. The rod is pivotally coupled to the pivot pin which is secured in position with a threaded bolt and washer. The pivot pin will have an aperture near its end. This will allow the receipt of a safety pin 37 which has a primary straight region with a diameter that enables it to fit in the aperture of the pivot pin. In an alternate embodiment the threads are eliminated with the coupling solely by the safety pin 37 for ease of assembly and disassembly. The rod also has an end aperture 38 facing downwardly adjacent to the eye end.

Additionally provided is a trip rod 42. The trip rod has an interior end 44 pivotally coupled to one leg, preferably a rear leg, beneath the reel. The trip rod also has an exterior end 46. It is located on the side thereof remote from the reel. The trip rod has a supplemental pin 50 adjacent to the exterior end. Such pin extends upwardly and is receivable in the end aperture of the fishing rod.

A resilient member preferably rubber band 54, is provided in tension. The rubber band couples the first end of the rod. The upper end of the rubber band is formed in a loop adapted to be receivably coupled to a hook at the adjacent end of the rod. The lover end of the rubber band is secured to a lower extent of the tripod leg. This arrangement tends to urge the reel end of the rod downwardly under the urging of the rubber band after a strike caused by a fish striking the bait. The second eye of the trip rod moves downwardly to move the supplemental pin out of the end aperture. This allows the rubber band to pull the reel end of the rod downwardly to thereby jerk the line upwardly to set the hook in the mouth of a fish.

Figure 6:
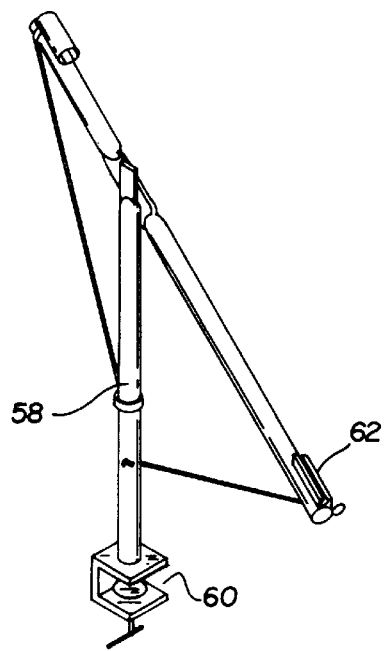
FIG. 6 is a perspective illustration of an alternate embodiment showing a variation in the support mechanism.

An alternate embodiment is shown in FIGS. 5 and 6. In such embodiment, the tripod is replaced by a vertical rod 58. The rod has a clamp 60 at its lower end for releasably coupling to a recipient surface. Further, the reel end of the rod has a resilient keeper 62 with an axial slot 64 for the removable receipt of a reel.

The fish trap of the present invention is a fishing device that provides improvement over existing fishing systems. The fish trap of the present invention consists of a folding tripod base which supports a fishing pole that has clamps to allow attachment of any chosen reel and a trip rod.

The fishing pole component is connected at its center to the tripod's apex, in a manner which allows it to pivot freely up and down. The rear of the fishing pole unit is connected to the rear leg of the tripod base by a length of surgical tubing a strong, stretchable material. The trip rod is a length of gauge wire, connected to the rear leg of the tripod up from the base.

At the reel end of the rod there is a rise in horizontal height of the center of the rod. The rise occurs from the butt of the rod. The upward swoop of the rod is needed to prevent the wet line from freezing to the rod shaft. The fish trap can also be mounted on a single shaft in a vertical manner with a clamp attached for boat or pier fishing. This allows the device to be used in fresh or salt water, as well as in any climate for sport or commercial fishing.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved fish trap system for supporting a fishing pole to automatically set the hook in the mouth of a fish after a strike comprising, in combination:

a tripod formed of three legs, each leg having a lower end positionable in a triangular orientation and an upper end coupled together with a common cylindrical pivot pin therethrough;

a fishing rod having a reel end with a reel coupled thereto and having an eye end with a first eye coupled thereon with line extending from the reel through the fist eye to a hook with bait, the fishing rod having an aperture at its central extent and pivotally coupled to the pivot pin with an end aperture facing downwardly adjacent to the eye end;

a trip rod having an interior end pivotally coupled to one leg beneath the reel and having an exterior end with a second eye in proximity to the first eye on the side thereof remote from the reel, the trip rod having a supplemental pin adjacent to the exterior end extending upwardly and receivable in the end aperture of the fishing rod; and a rubber band in tension coupling the reel end of the fishing rod and the bottom of the one leg beneath the reel tending to urge the reel end of the rod downwardly whereby when a fish strikes the bait, the second eye of the trip rod will move downwardly under the urging of the line to move the supplemental pin out of the end aperture and allow the rubber band to pull the reel end of the rod downwardly to thereby jerk the line upwardly to set the hook in the mouth of a fish.

2. A fish trap system comprising:

a support having a lower end and an upper end with a pivot pin therethrough;

a fishing rod having a reel end with a reel couplable thereto and having an eye end with a first eye coupled thereon with line extendable from the reel through the first eye to a hook with bait, the fishing rod having an aperture at its central extent for pivotally coupling to the pivot pin with an end aperture facing downwardly adjacent to the first eye;

a trip rod having an interior end pivotally coupled to the lower end of the support and having an exterior end with a second eye in proximity to the first eye on the side thereof remote from the reel, the trip rod having a supplemental pin adjacent to the exterior end extending upwardly received in the end aperture of the fishing rod; and a resilient member in tension coupling the reel end of the fishing rod and the lower end of the support tending to urge the reel end of the rod downwardly.

3. The system as set forth in claim 2 wherein the support is a tripod.

4. The system as set forth in claim 2 wherein the support is a vertical rod with a clamp at its lower end.

5. The system as set forth in claim 2 and further including a keeper fabricated of a resilient material for the removable receipt of a reel.

\* \* \* \* \*